United States Patent [19]

Toma et al.

[11] 4,439,258

[45] Mar. 27, 1984

[54] METHOD FOR COVERING WITH CYLINDRICALLY SHAPED HEAT-SHRINKABLE FILM

[75] Inventors: Hitoshi Toma; Tomohiro Kimura, both of Kawasaki; Hideyo Kondo, Matsudo, all of Japan

[73] Assignee: Canon Kabushiki Kaisha, Tokyo, Japan

[21] Appl. No.: 377,928

[22] Filed: May 13, 1982

[30] Foreign Application Priority Data

May 26, 1981 [JP] Japan .................................. 56-80622

[51] Int. Cl.³ ............................................... B29C 27/20

[52] U.S. Cl. ....................................... 156/86; 156/165; 430/67; 430/132

[58] Field of Search ..................... 430/67, 132; 156/86, 156/165

[56] References Cited

U.S. PATENT DOCUMENTS

| | | | |
|---|---|---|---|
| 3,734,273 | 5/1973 | Watanabe | 156/86 |
| 3,819,370 | 6/1974 | Komiya | 430/67 |
| 3,967,993 | 7/1976 | Isomi | 156/86 |

*Primary Examiner*—John E. Kittle

*Assistant Examiner*—John L. Goodrow

*Attorney, Agent, or Firm*—Fitzpatrick, Cella, Harper & Scinto

[57] ABSTRACT

The present invention relates to a method for covering a substrate with a cylindrically shaped heat-shrinkable film, particularly to a method for covering a cylindrically shaped heat-shrinkable film so as to fit the contour of a substrate by conducting the heat treatment in multiple steps at different temperatures.

4 Claims, 1 Drawing Figure

METHOD FOR COVERING WITH CYLINDRICALLY SHAPED HEAT-SHRINKABLE FILM

BACKGROUND OF THE INVENTION

1. Field of the Invention

This invention relates to a method for covering a substrate with a cylindrically shaped heat-shrinkable film.

2. Description of the Prior Art

There have heretofore been used cylindrically shaped heat-shrinkable films for the purpose of protection of various articles. A cylindrically shaped heat-shrinkable film is a film in a shape of cylinder which can shrink by heating, and it is a general practice to apply a cylindrically shaped heat-shrinkable film over a certain article followed by heating, whereby there is formed a covering in close contact along the surface contour of the article. Thus, surface covering is possible with the use of a cylindrical heat-shrinkable film only by heating and within a short period of time, and hence cylindrically shaped heat-shrinkable films have frequently been used for various packaging purposes. However, when a cylindrically shaped heat-shrinkable film is utilized for covering of an article for which a precision is required, a cylindrically shaped heat-shrinkable film chosen is required to be as flawless as possible. Nevertheless, the heat-shrinkable films perpared according to the methods of prior art suffer from lines of flection formed thereon, which will being about deleterious influences on covering of an article for which a percision is required. For example, in case of surface covering on an electrophotographic photosensitive material, the image characteristics at the line of flection are extremely worsened to give rise to disorders of image or bad cleaning performance.

Formation of a line of flection on a cylindrically shaped heat-shrinkable film of prior art is due to its production method, as explained now with reference to the drawing. FIG. 1 is a typical example of the production method of prior art. That is, a starting material resin 1 is fed into a hopper 6 and then melted by heating. The molten starting material resin progresses along the arrow 7 until it is extruded through an annular die portion 2. And, an inflating air is blown through a blow inlet for stretching of the extruded cylindrically shaped film. The staring material resin molten by heating is extruded through the annular die portion 2 and, while being wound up and drawn upwardly simultaneously with blowing of the inflating air to perform stretching operation, the cylindrically shaped heat-shrinkable film 8 is flexed through the roller 4 and wound up on the wind-up roller 5. Thus, the line of flection is formed in the course of winding up the fabricated cylindrically shaped heat-shrinkable film.

Even when using a cylindrically shaped heat-shrinkable film free from such a line of flection, it is not easy to have the film shrunk fitted to the contour of a substrate. That is, in the state prior to heat shrinkage, a cylindrically shaped heat-shrinkable film covers the surface of a substrate. But not all the portions of the cylindrically shaped heat-shrinkable film contacts the surface of the substrate, that is, some portions are contacted while other portions remain uncontacted. The heat-shrinkable film at the portions contacted with the substrate will permit a considerable amount of heat to be dissipated into the substrate on heating and therefore undergoes heat shrinking at a slow rate. On the other hand, the heat-shrinkable film at the portions not contacted with the substrate will difficultly release the heat applied toward the substrate and therefore heat shrinking occurs rapidly. As the result, there takes place partially irregularity in the extent of heat shrinkage, and therefore, the film thickness of the portions shrunk earlier increases while that of the portions shrunk later is reduced, whereby no uniform heat shrinkage can be accomplished.

SUMMARY OF THE INVENTION

The primary object of the present invention is to provide a method for covering a substrate with a cylindrically shaped heat-shrinkable film with a line of flection, by which no inconvenient trace of the line of flection may remain on the shrunk film.

Another object of the present invention is to provide a method for covering a cylindrically shaped heat-shrinkable film with or without a line of flection, by which the film can be heat shrunk uniformly.

Still another object of the present invention is to provide a method for covering a cylindrically shaped heat-shrinkable film, by which entrapment of a heating medium between a substrate and a cylindrically shaped heat-shrinkable film can be avoided.

According to the present invention, there is provided a method for covering with a cylindrically shaped heat-shrinkable film, which comprises the steps of: covering a substrate with a cylindrically shaped heat-shrinkable film; subjecting said cylindrically shaped heat-shrinkable film to a first shrinking at the portion corresponding to the lower end of said substrate at a temperature of the higher temperature zone in the heat-shrinkable temperature range of said film; subjecting said film, except for the portion corresponding to the upper end of said substrate, to a second shrinking at a temperature of the lower temperature zone in said temperature range; and subjecting said film wholly to a third shrinking at a temperature of the higher temperature zone in said temperature range, using a liquid heating medium for heating in the above steps of shrinking.

DESCRIPTION OF THE PREFERRED EMBODIMENT

Figure 1:
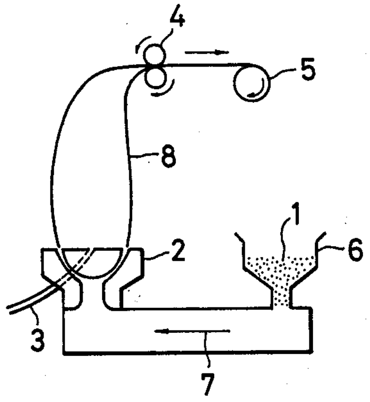
FIG. 1 shows a process for producing a cylindrically shaped heat-shrinkable film.

According to the present invention, in the first place a substrate is covered with a cylindrically shaped heat-shrinkable film and the film is subjected first at the lower end of the substrate to heat shrinking, whereby entrapment of a heating medium between the substrate and the cylindrically shaped heat-shrinkable film is prevented. This shrinking is the first shrinking treatment which is performed at a temperature of the higher temperature zone of the heat-shrinkable temperature range of the cylindrically shaped heat-shrinkable film. By such a treatment, the cylindrically shaped heat-shrinkable film covering over the lower end of the substrate is abruptly shrunk to prevent entrapment of a heating medium. Subsequent to the first shrinking, the second shrinking treatment and the third shrinking treatment are carried out. By performing the third shrinking treatment at the higher temperature zone of the heat-shrinkable temperature range in addition to the second shrinking treatment at the lower temperature zone of said temperature range, there can be accomplished a covering free from any inconvenient trace of line of flection remaining on the cylindrically shaped heat-shrinkable film. That is, by the second shrinking treatment at said lower temperature zone, heat shrinking proceeds slowly, whereby the degree of shrinking is not so different from place to place (even if there may be portions contacted with a substrate and portions not contacted, the difference between both portions does not become so much). Through heat shrinkage in the next step at said high temperature zone, the whole cylindrically shaped heat-shrinkable film is completely shrunk to accomplish a uniformly covered state. It is particularly effective to employ a heating temperature for the third shrinking treatment which is higher by 15° C. or more than the minimum temperature of heat-shrinkable temperatures.

Particularly in the present invention, a liquid is used as the heating medium, whereby the heat content of the heating medium can be increased to enable lowering of shrinking temperature and shortening of shrinking treatment time. Since the shrinking treatment can be done within a short time, the effect of heat on a substrate can be decreased.

The first, second and third shrinking treatments may be conducted under the conditions, which may differ depending on the cylindrically shaped heat-shrinkable film employed, but the second shrinking treatment may be conducted generally at a temperature of 70° to 90° C., particularly 75° to 90° C., for a heating time which may sufficiently be 3 minutes or less. At the time of completion of the second shrinking treatment, shrinking appears to be completed apparently to have formed a uniform film, but there remains yet the trace of flection line, which will clearly appear on produced image in case of an electrophotographic photosensitive material.

The first and the third shrinking treatments may be preferably conducted at a temperature of 85° C. to 120° C., particularly 85° to 100° C. As the heating time, 2 min. or less is sufficient. On the cylindrically shaped heat-shrunk film after the third shrinking, there is still observed a trace of flection line, which trace, however, will not appear as an inconvenient trace. It is not easy to have such a trace of flection line completely disappeared during heat shrinking. The third shrinking may be conducted after the second shrinking by elevating the temperature either continuously or stepwise.

The temperature difference in heating between the first shrinking or the third shrinking and the second shrinking may perferably 10° C. or higher.

If shrinking is effected at a temperature near the third shrinking temperature without performing the second shrinking, abrupt shrinking will occur momentarily to entrap the air and therefore no complete shrinking can be expected.

As the substrate to be used in the present invention, there may be employed various articles, but a typical example of such materials is a substrate for image holding member to be used in electrophotography.

As an image holding member for electrophotography on which electrostatic images or toner images are formed, there is an image holding member which is called as an electrophotographic photosensitive material having a photoconductive layer on a support, and also an image holding member having no photoconductive layer. Generally, it is constituted of a support and an image holding layer provided thereon. Accordingly, in case of an electrophotographic photosensitive material, the substrate is a support having formed a photoconductive layer on its surface, while in case of an image holding member having no photoconductive member, the substrate is a support. In both cases, a cylindrically shaped heat shrunk film is used as an insulating layer.

Electrophotographic photosensitive materials will assume various constitutions in order to obtain desired characteristics, or depending on the electrophotographic processes to be applied. As a typical example of an electrophotographic photosensitive material, there is a photosensitive material composed of a support, a photoconductive layer overlying the support and an insulating layer overlying the photoconductive layer, which has widely been employed. An insulating layer is provided for various purposes such as protection of the photoconductive layer, improvement in mechanical strength of the photosensitive material, improvement in dark decay characteristics or application for a specific electrophotographic process. Typical examples of such photosensitive materials having insulating layers or electrophotographic processes using such photosensitive materials are disclosed in, for example, U.S. Pat. No. 2,860,048, Japanese Patent Publication Nos. 16429/1966, 15446/1963, 3713/1971, 23910/1967, 24748/1968, 19747/1967 and 4121/1961.

For an electrophotographic photosensitive material, a desirable electrophotographic process is applied to form an electrostatic image thereon, and the electrostatic image is developed for visualization.

A typical constitution of an image holding member having no photoconductive layer has an insulating layer as an image holding layer. Some of the representative uses of such an image holding member are exemplified below:

(1) As disclosed in, for example, Japanese Patent Publication Nos. 7115/1957, 8204/1957 and 1559/1968, for the purpose of improvement of repeated use characteristics of an electrophotographic photosensitive material, an electrostatic image formed on an electrophotographic photosensitive material is transferred onto an image holding member having no photoconductive member and then developed to form a toner image followed by transfer of the resulting toner image onto a recording medium. An image holding member to be used in such an electrophotographic process.

(2) Alternatively, as another electrophotographic process for forming an electrostatic image on an image holding member having no photoconductive layer corresponding to the electrostatic image formed on an electrophotographic photosensitive material, as disclosed in, for example, Japanese Patent Publication Nos. 30320/1970 and 5063/1973, and Japanese Laid-Open Patent Application No. 341/1976, there may be mentioned a process in which an electrostatic image is formed according to a desirable electrophotographic process on a screen-like electrophotographic photosensitive material having a number of minute openings, and corona charging treatment is applied to an image holding member having no photoconductive member through the electrostatic image thereby to modulate the ion stream of corona and form the electrostatic image on the image holding member having no photoconductive member, followed by toner development of the electrostatic image and then transferring the resulting toner image onto a recording medium to form the final image.

The characteristics of such an insulating layer of the image holding member will have noticeable effects on the image quality of the image formed, and for this reason it is effective to produce a good insulating layer by using a heat shrunk film.

As cylindrically shaped heat-shrinkable films to be used in the present invention, there may be conveniently employed heat-shrinkable films made of a material such as polyvinyl chloride, polypropylene, polyester, polystyrene, polyvinylidene chloride, polyethylene, chlorinated rubber, and the like. As a film which is excellent in surface smoothness and mechanical strength, being consequently excellent in durability, cleaning characteristic and corona resistance, and further excellent in humidity resistance and weathering resistance, there may be mentioned heat-shrinkable poly (ethyleneterephthalate) films.

As a liquid to be used as a heating medium, there may be preferably employed a liquid having a relatively high boiling point, for example, water, polyethyleneglycol, glycerine, liquid paraffins, silicone oils, etc.

Example 1

To 100 parts (by weight) of CdS powders, there were added 14 parts of a solvent-soluble vinyl chloride-vinyl acetate copolymer (trade name: VMCH; produced by UCC) and 30 parts of methyl ethyl ketone solvent. After the mixture was subjected repeatedly three times to roll milling through a 80μ gap, it was adjusted to a viscosity of 300 cps and coated on an aluminum cylinder of 80φ×300 mm by a dip coating method, following by drying at 80° C. for 20 minutes, to provide a photoconductive layer of 40μ thick.

The thus prepared sample was covered with a polyester heat-shrinkable tube of 90 mm in diameter (produced by Hoechst; heat-shrinkable temperature: 70° C. or higher) and the lower end (non-image region) of the drum was subjected to heat treatment with hot water of 95° C. for 20 seconds. Then, the drum was dipped vertically into a low temperature hot water of 80° C. for 30 seconds with the upper end (non-image portion) being left undipped, and thereafter the whole region including the upper end was subjected to heat treatment again with hot water of 95° C. for 15 seconds.

On the resultant photosensitive material, there was formed a latent image by primary ⊕ charging, secondary AC discharging simultaneously with image exposure and whole surface irradiation, and then development, transfer and cleaning steps were practiced repeatedly. Using such an electrophotographic process durability and image formation were tested, whereby no image irregularity due to line of flection or entrapment of the air was observed and there was observed no change in potential characteristics by the heat treatments at all. In this example, when the whole body was subjected once to the heat shrinkage only by the heat treatment at 95° C., the resultant photosensitive material, when subjected to similar image formation, gave the result that the image density at the flection line of the heat shrunk tube was lowered to give a white line.

Example 2

According to the same procedure as described in Example 1, there was provided a photoconductive layer of 40μ which on a 80φ×300 mm aluminum cylinder.

The resultent sample was covered with a heat-shrinkable film made of a polyvinyl chloride of 85 mm in diameter with a thickness of 25μ (shrinkage: 20%; heat-shrinkable temperature: 65° C. or higher) and the lower end (non-image region) of the drum was subjected to heat treatment with hot water of 90° C. for 30 seconds. Then, the drum was dipped vertically into a low temperature hot water of 75° C. for 50 seconds with the upper end (non-image region) being left undipped, and thereafter the whole region including the upper end was subjected to heat treatment again with hot water of 85° C. for 30 seconds.

When durability and image formation were tested for the thus prepared photosensitive material based on the same electrophotographic process as in Example 1, there was observed no image irregularity by flection line, shrinkage irregularity or entrapment of the air, and there was also no deterioration in potential characteristics by the heat treatments at all.

Example 3

According to the same procedure as described in Example 1, there was provided a photoconductive layer of 40μ thick on a 80φ×300 mm aluminum cylinder.

The resultant sample was covered with a heat-shrinkable tube made of a polyester of 85 mm in diameter (film thickness: 25μ; shrinkage: 25%; heat-shrinkable temperature: 70° C. or higher) and the lower end (non-image region) of the drum was subjected to heat treatment with polyethylene glycol (polymerization degree: 4000) of 100° C. for 30 seconds. Then the drum was dipped vertically into a polyethylene glycol (polymerization degree: 4000) of 80° C. for 30 seconds with the upper end (non-image region) being left undipped, and thereafter the whole region including the upper end was subjected to heat treatment again with polyethylene glycol of 100° C. (polymerization degree: 4000) for 20 seconds. After cooling to room temperature, the polyethylene glycol adhered on the surface was removed by washing with water to provide a photosensitive material.

When durability and image formation were tested for the thus prepared photosensitive material based on the same electrophotographic process as in Example 1, there was observed no image irregularity by flection line, shrinkage irregularity or entrapment of the air, and there was also no deterioration in potential characteristics by the heat treatments at all.

Comparative example 1

In Examples 1, 2 and 3, the first shrinking step was omitted and photosensitive materials were prepared directly according to only the second and third shrinking steps.

In any case, the heating medium penetrated into the photoconductive layer to destroy the characteristics of the photoconductive layer and there was observed image irregularity.

Comparative example 2

In Examples 1, 2 and 3, photosensitive materials were prepared according to only the first and second shrinking steps, by omitting the third shrinking step.

In any case, the line of flection had a height which was very high, and the photosensitive material obtained could not stand repeated uses due to incomplete shrinkage. The heights of respective lines of flection are shown below.

| Example | In case of only first and second shrinking steps | In case of first, second and third shrinking steps |
|---|---|---|
| 1 | 15μ | 1.0μ |
| 2 | 20μ | 1.0μ |
| 3 | 12μ | 0.5μ |

What we claim is:

1. A method for covering with a cylindrically shaped heat-shrinkable film, which comprises the steps of:

covering a substrate with a cylindrically shaped heat-shrinkable film;

subjecting said cylindrically shaped heat-shrinkable film to a first shrinking at the portion of the film corresponding to the lower end of said substrate at a temperature of the higher temperature zone in the heat-shrinkable temperature range of said film;

subjecting said film, except for the portion corresponding to the upper end of said substrate, to a second shrinking at a temperature of the lower temperature zone in said temperature range; and subjecting said film wholly to a third shrinking at a temperature of the higher temperature zone in said temperature range, using a liquid heating medium for heating in the above steps of shrinking.

2. A method for covering with a cylindrically shaped heat-shrinkable film according to claim 1 wherein the heating temperature in the first shrinking and the third shrinking is higher by 10° C. or more than that in the second shrinking.

3. A method for covering with a cylindrically shaped heat-shrinkable film according to claim 1 wherein the substrate is an image holding member for electrophotography on which an electrostatic image or a toner image is to be formed.

4. A substrate whose surface is covered with a cylindrically shaped heat shrunk film according to the method according to claim 1.

* * * * *

UNITED STATES PATENT AND TRADEMARK OFFICE

CERTIFICATE OF CORRECTION

PATENT NO. : 4,439,258

DATED : March 27, 1984

INVENTOR(S) : HITOSHI TOMA, ET AL.

It is certified that error appears in the above-identified patent and that said Letters Patent is hereby corrected as shown below:

Col. 1, line 15, "in a shape of cylinder" should be --in the shape of a cylinder--.
Col. 1, line 29, "perpared" should be --prepared--.
Col. 1, line 32, "percision" should be --precision--.
Col. 1, lines 35-36, "worsened" should be --deteriorated--.
Col. 1, line 63, "contacts" should be --contact--.
Col. 2, line 3, "will difficulty" should be --will, with difficulty--.
Col. 2, line 5, "partially" should be --partial--.
Col. 3, line 34, "to have formed" should be --having formed--.
Col. 3, line 36, before "produced" insert --the--.
Col. 3, lines 45-46, "disappeared" should be --disappear--.
Col. 3, line 48, "stepwise" should be --stepwisely--.
Col. 3, line 51, "perferably" should be --preferably be--.
Col. 3, line 59, before "image" insert --an--.
Col. 3, line 64, after "called" delete --as--.
Col. 4, line 1, before "case" insert --the--.
Col. 4, line 3, before "case" insert --the--.
Col. 4, line 46, after "member" insert --is--.
Col. 5, line 33, before "40μ" delete --of--.

UNITED STATES PATENT AND TRADEMARK OFFICE
CERTIFICATE OF CORRECTION

PATENT NO. : 4,439,258

DATED : March 27, 1984

INVENTOR(S) : HITOSHI TOMA, ET AL.

It is certified that error appears in the above-identified patent and that said Letters Patent is hereby corrected as shown below:

Col. 5, line 65, after "40u" delete --which--.
Col. 5, line 66, "resultent" should be --resultant--.
Col. 6, line 22, before"40u" delete --of--.

Signed and Sealed this

*Fourteenth* Day of *August 1984*

[SEAL]

*Attest:*

GERALD J. MOSSINGHOFF

*Attesting Officer*

*Commissioner of Patents and Trademarks*